Sept. 4, 1928.  W. A. CRAIG  1,682,888
POWER REVERSE GEAR FOR LOCOMOTIVES
Filed March 10, 1925  5 Sheets-Sheet 3
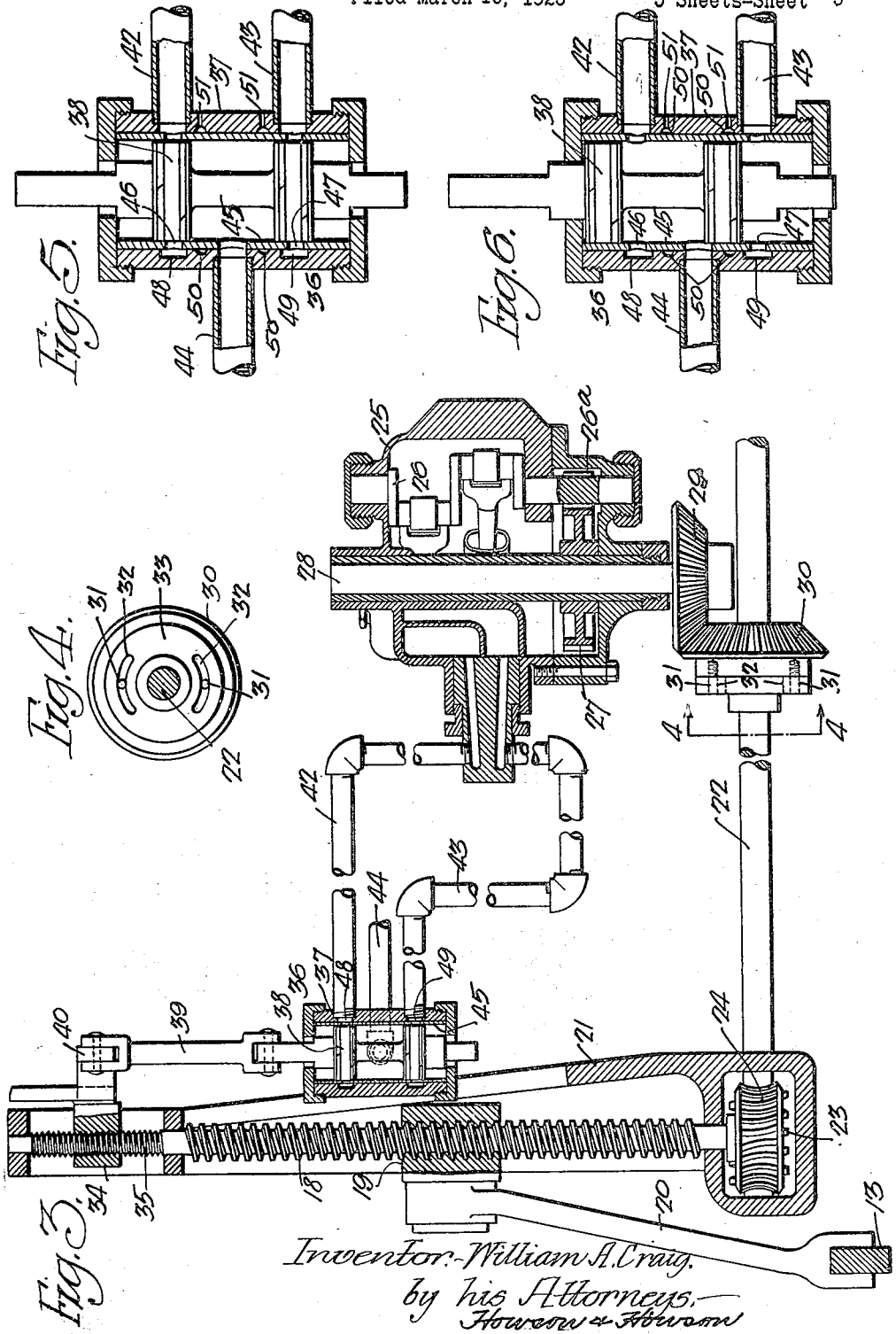

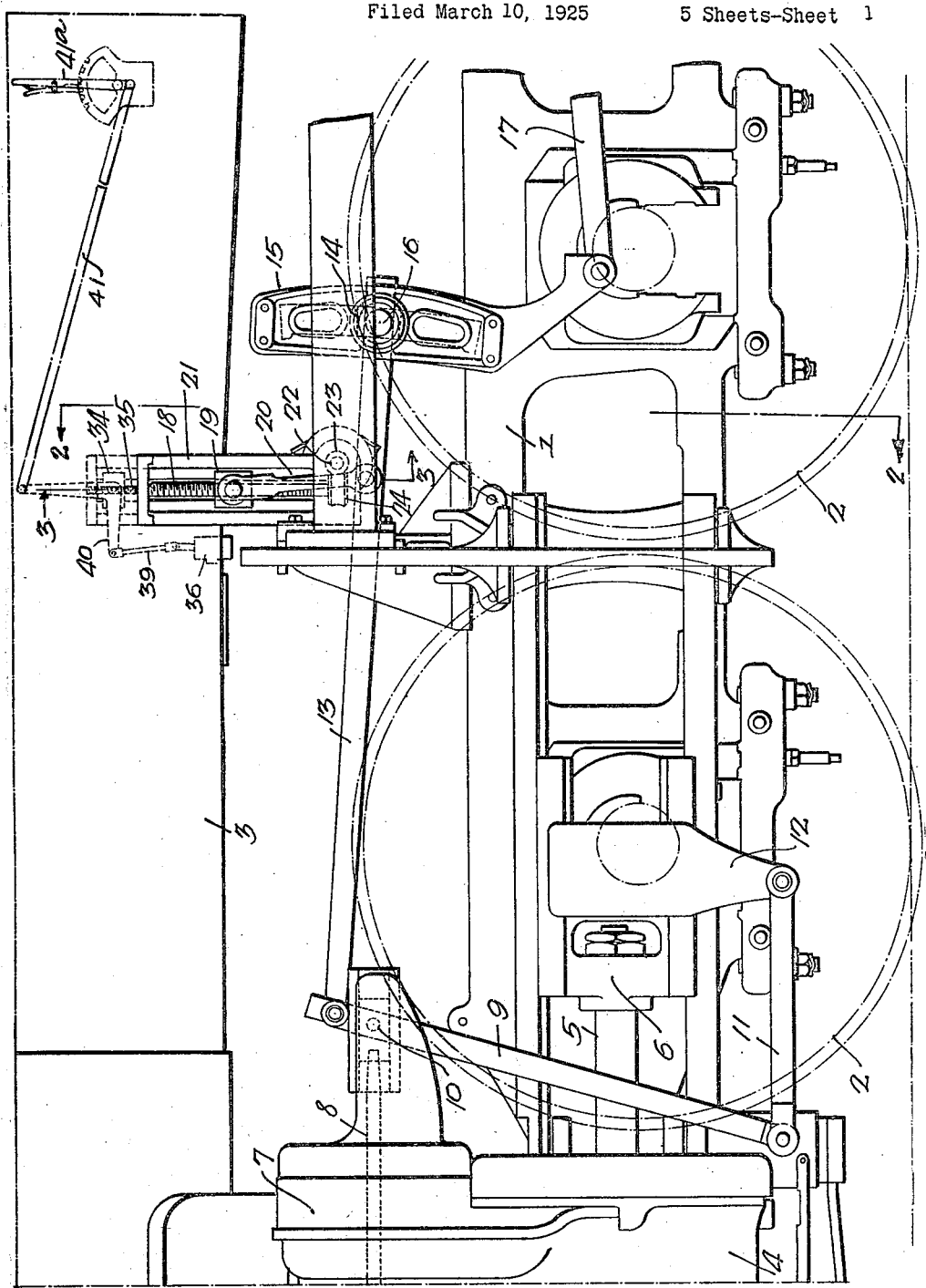

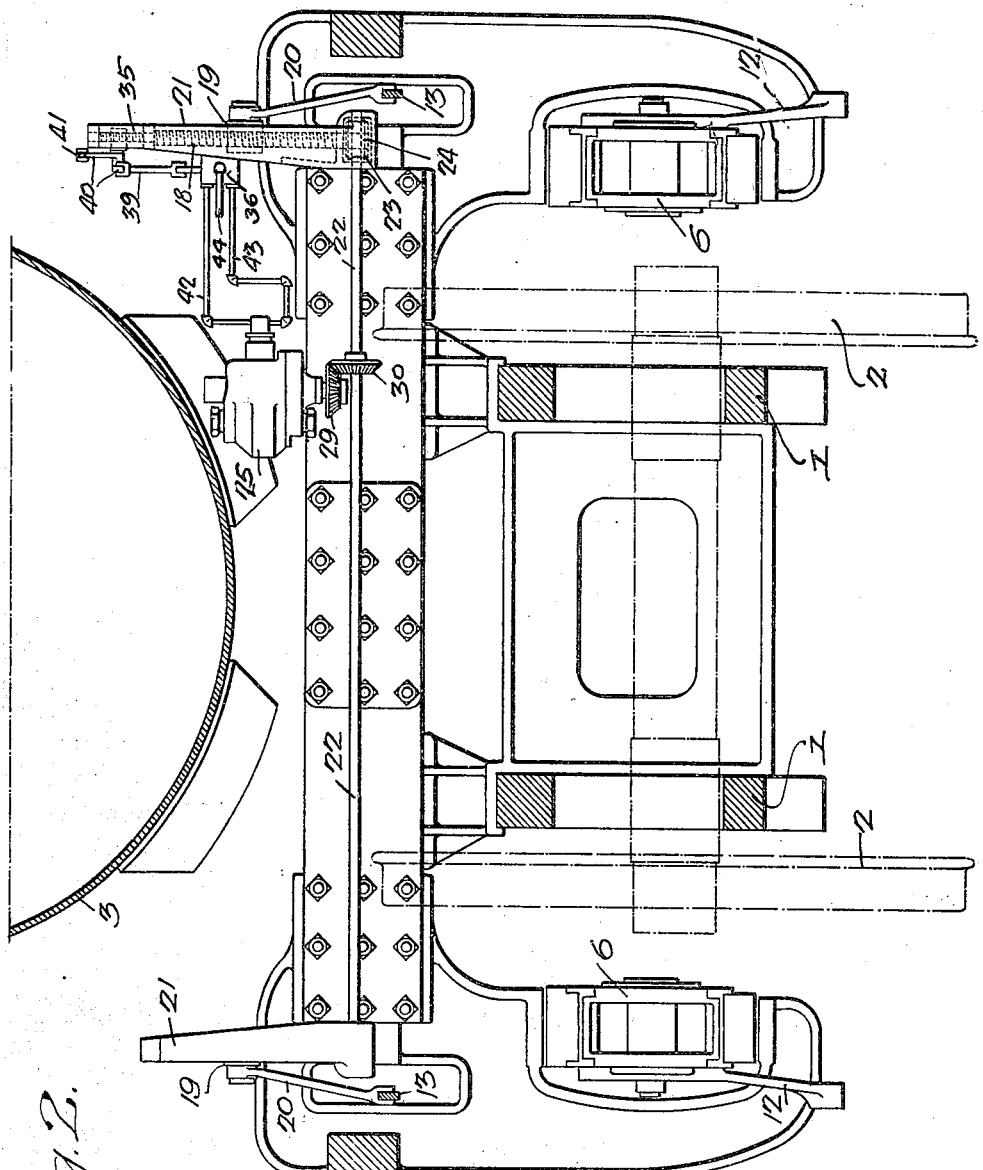

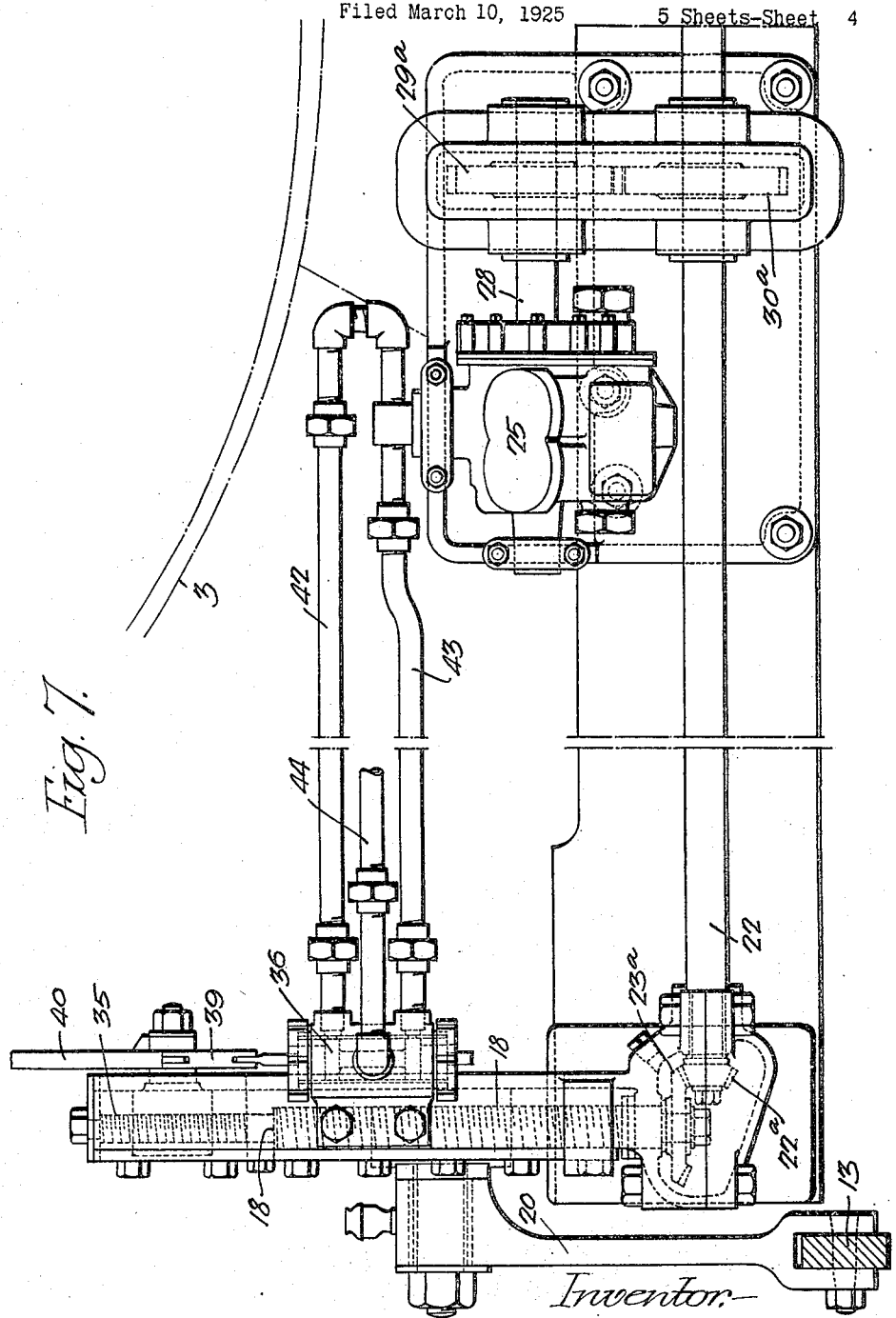

Sept. 4, 1928.
W. A. CRAIG
1,682,888
POWER REVERSE GEAR FOR LOCOMOTIVES
Filed March 10, 1925   5 Sheets-Sheet 5
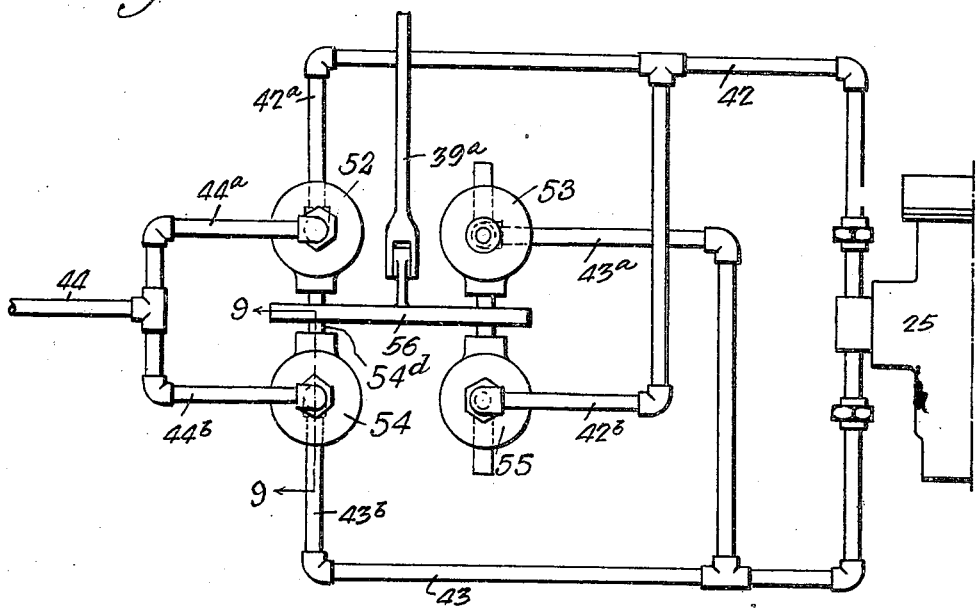
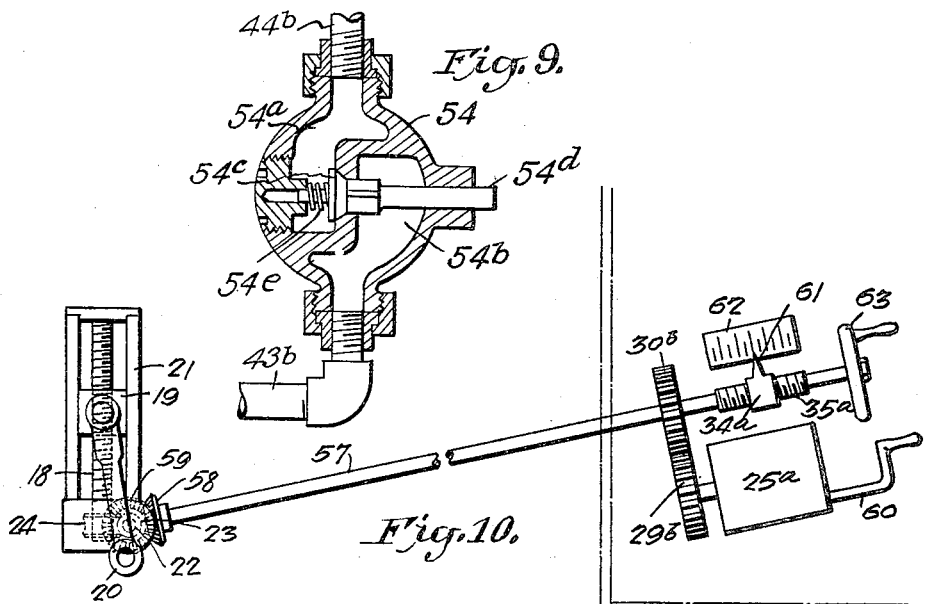
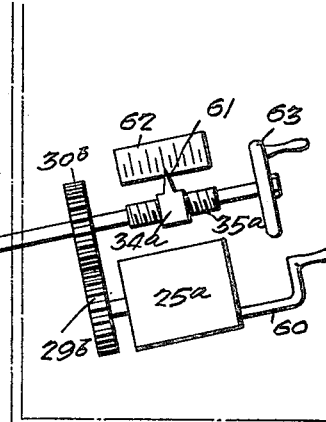
Inventor:—
William A. Craig.
by his Attorneys.—
Howson & Howson Patented Sept. 4, 1928.

1,682,888

UNITED STATES PATENT OFFICE.

WILLIAM A. CRAIG, OF PHILADELPHIA, PENNSYLVANIA.

POWER REVERSE GEAR FOR LOCOMOTIVES.

Application filed March 10, 1925. Serial No. 14,537.

My invention relates to power operated mechanism or gearing for adjusting or changing the operative relation of the valve reverse linkage for steam or air locomotives.

One object of the invention is to provide gearing for this purpose which is simple in construction and reliable in operation, and which will hold the parts in adjusted position without any possibility of "creeping". Another object of the invention is to provide a mechanism of this type which will operate smoothly and steadily without exerting any shock or abnormal stress on any of the operating parts, and which will not detrimentally modify the valve action.

Still another object of the invention is to provide a reverse gearing and a mounting therefor which will eliminate all strains on the boiler and transmit such strains directly to the main frame of the locomotive.

Further objects of the invention are to provide certain improved details of construction which assist in making possible the desirable results already referred to. Still further objects of the invention will be apparent from the following specification and claims.

In the accompanying drawings I have shown several embodiments of the invention but it will be understood that these have been selected merely for purposes of illustration and that the invention may be embodied in other forms and that various changes may be made without departing from the spirit of the invention as set forth in the claims.

Of the drawings,

Figure 1 is a fragmentary view of the left side of a locomotive having a reverse gear mechanism embodying the invention.

Fig. 2 is a transverse view looking toward the front of the locomotive, this view being partly in section along the line 2—2 of Fig. 1.

Fig. 3 is an enlarged fragmentary transverse view, taken looking toward the rear of the locomotive, this view being partly in section, along the line 3—3 of Fig. 1.

Fig. 4 is a detail view showing the connection for one of the gears, being a section along the line 4—4, Fig. 3.

Figs. 5 and 6 are fragmentary views, partly diagrammatic and on a still larger scale, showing the control valve in two different positions.

Fig. 7 is a view similar to Fig. 3 but showing an alternate construction.

Fig. 8 is a diagrammatic view showing an alternate form of valve mechanism which may be substituted for that shown in Figs. 5 and 6.

Fig. 9 is an enlarged detail sectional view taken along the line 9—9 of Fig. 8 and showing one of the valves.

Fig. 10 is a fragmentary side view in some respects similar to Fig. 1 but showing a different location for the motor.

As shown particularly in Figs. 1 and 2, the main frame of the locomotive is represented by 1, this frame being carried on drive wheels 2—2 and supporting a boiler structure 3. One of the cylinders is represented at 4 and the piston rod is shown at 5. this being connected with the cross head 6. The corresponding steam chest is represented at 7 and the valve yoke is indicated at 8.

For operating the valve yoke 8 any usual or preferred link motion may be employed. For purposes of illustration, however, I have shown a link motion which includes a lap and lead rod 9, pivoted to the valve yoke at 10. A cross head link 11 pivotally connects the lower end of the rod 9 with a lug 12 on the cross head 6. At a point above the pivotal connection 10 the rod 9 is pivotally connected with a radius rod 13. Pivotally connected with the rear end of the radius rod is a block 14, which is adapted to be adjusted in a segmental slot in a reverse link 15. The reverse link is pivoted to the frame at 16 and at its lower end it is pivotally connected with an eccentric rod 17, which extends rearward to an eccentric crank arm connected with one of the drive wheels. The relation of the radius rod 13 to the reverse link 15 can be changed by the mechanism to which the invention particularly relates. It will be understood that the link mechanism which I have described is duplicated on the other side of the locomotive.

From the foregoing description it will be apparent that the rod 9 when oscillated by the link 11 serves to reciprocate the valve yoke 8. This motion, however, is modified and controlled by the endwise motion which the radius rod receives from the reverse link 15. When the radius rod is in its central or neutral position, as shown, it has no endwise motion. When the rod is raised or lowered, varying amounts of endwise motion are obtained and the varying extent and the different directions of this motion serve to regulate the flow of steam to the cylinders and also serve to reverse the direction of travel of the locomotive. The link motion as described is a typical one, but many others are in common use and my invention is applicable to any of them.

In accordance with my invention, a motor is provided and this motor is connected with a speed reducing adjusting mechanism which serves to vary or change the cooperative relation of the linkage, and in the construction illustrated it changes the relation between the radius rod and the reverse link. The mechanism includes a screw and nut or equivalent mechanism which is self-locking and which makes it impossible for motion to be transmitted from the linkage to the motor. Therefore, it is impossible for the motor or the adjusting mechanism to be moved or changed by the weight or vibration of the linkage. Inasmuch as there is a considerable speed reduction between the motor and the linkage the motor is enabled to do its work easily and a steady progressive movement is imparted to the linkage, all tendency toward sudden or jerky movements being eliminated.

With the construction shown and described, the adjusting mechanism directly engages the reverse link to raise or lower it. It will be understood, however, that with other types of link motions it may be necessary to differently connect the controlling mechanism in order to secure the desired results. Preferably the adjusting mechanism for changing the operative relation between the reverse link and the radius rod includes two rotatable screws and cooperating non-rotatable nuts located in close relationship to the radius rods or other parts to be adjusted. With the type of linkage shown the screws are vertical and are located close to the planes of movement of the rods. The screws are shown at 18, 18 and the nuts are shown at 19, 19. I provide as direct a connection as possible between the nuts 19, 19 and the radius rods or other parts to be adjusted. With the linkage as shown substantially straight links 20, 20 are provided, these being pivotally connected at their upper ends directly with the nuts 19 and pivotally connected at their lower ends directly with the radius rods 13.

The weight of each radius rod is thus carried directly by the corresponding screw 18 and link 20. Inasmuch as the screw is close to the plane of movement of the rod and the link is short and substantially straight there is little or no possibility of vertical play or lost motion, such as might result from the wear of joints or the springing of levers and shafts in a more complicated mechanism. The position of the rod is determined accurately by the amount of relative movement of the screw, and inasmuch as the screw and nut constitute a self-locking device there is no possibility of their being moved by the weight or vibration of the linkage.

With the construction shown the point of support for each radius rod moves in a straight line approximately at right angles to the central position of the rod. Thus any distortion of the valve movement in different positions of adjustment is reduced to a minimum and the desired exact relative valve cut-off is secured.

The screws 18, 18 are mounted respectively in brackets 21, 21 which are bolted or otherwise secured to the frame of the locomotive independently of the boiler. This avoids any pulling or twisting strains on the boiler. This is a very important feature, as it has been common practice to mount power reverse mechanisms on the boiler. This has made it necessary for the boiler not only to carry the weight of the mechanism but also to resist the very considerable strains resulting from the sudden movements which have usually been incidental to the operation of power reverse mechanisms. Such sudden strains have loosened the studs holding the mechanism and have tended to weaken the entire boiler. Furthermore, by mounting the reverse mechanism on the frame I simplify the work of maintenance and repair as the boiler can be removed without in any way disturbing the reverse mechanism.

The two screws 18, 18 are connected together for rotation in unison and for this purpose I provide a transverse motor driven power shaft 22. Gearing at the ends of the shaft serves to connect it with the screws, and as shown in Figs. 1 to 3, this gearing consists of worms 23 and worm wheels 24. The worms and worm wheels also serve as self-locking devices interposed between the motor and the valve reverse linkage. Obviously motion cannot be transmitted backward through the worm wheels and worms to rotate the motor.

From the foregoing description it will be apparent that the adjustments of the linkages at the two sides of the locomotive are kept in proper timed relation by means of the said transverse shaft 22. This entirely eliminates the ordinary reverse shaft which has always been a source of great expense and trouble in locomotive construction and maintenance. This reverse shaft operates with little or no mechanical advantage and it must be very strong and heavy. It must not only transmit the force necessary to adjust the linkage but it must also be able to resist and absorb the shocks due to the sudden action of ordinary reverse mechanism. Constant repairs and replacements have been necessary. The shaft 22 acts through the screws and nuts and therefore has great mechanical advantage. It operates at a relatively high speed and it can do its work without being subjected to any undue stresses.

The motor for rotating the shaft 22 and thereby actuating the adjusting mechanism is preferably of the type in which the power is transmitted from a rotary drive shaft. As concerns certain phases of the invention, I do not limit myself to any one form of motor but I consider it ordinarily preferable to use a motor deriving its power from an elastic fluid, which may be either compressed air or steam. Such a motor is shown at 25 in Figs. 2 and 3. This motor does not of itself constitute a part of my present invention and it will not be described in detail. It is sufficient to say that it comprises two or more pistons operating in suitable cylinders and having connecting rods engaging a crank shaft 26. A gear 26$^a$ on the shaft 26 meshes with a gear 27 on a rotary drive shaft 28. Suitable gearing is provided between the drive shaft 28 and the aforesaid power shaft 22. As shown in Figs. 2 and 3, the motor 25 is arranged with its axis vertical and with this relative location of the motor bevel gears 29 and 30 are provided for connecting the shafts 28 and 22. Preferably, I provide a lost motion connection between the motor and the shaft 22 which will enable the motor to start easily and thereafter pick up the parts to be driven. As shown more clearly in Figs. 3 and 4, the gear 30 instead of being directly connected to the shaft 22 is loosely mounted thereon and carries pins 31, 31 which project into arcuate slots 32, 32 in a disc 33, which is directly keyed or otherwise connected to the shaft 22. It will be seen that upon each reversal of motion it is possible for the motor to overcome its own inertia and get well under way before it has to pick up and drive the shaft 22 and the parts connected therewith.

In the operation of a locomotive it is necessary for the engineer from time to time to change the operative relation of the link mechanism, and when a motor operated reverse gear is provided there must not only be means whereby the engineer can start the motor, but there must also be means associated with the motor and enabling it to be stopped after a desired definite amount of movement. I therefore provide not only suitable control mechanism within the convenient reach of the engineer for starting or reversing the motor but I also provide a regulating device which is movable in timed relation with the adjusting mechanism and which enables the motor to be stopped after a definite movement as aforesaid.

In the construction shown in Figs. 1 to 3 this regulating device is in the form of a nut 34, which engages a screw 35. This screw is preferably directly connected with one of the screws 18 and may conveniently be formed integrally therewith, the two together constituting a differential screw. Ordinarily the screw 35 is formed with a much finer pitch than that of the screw 18, as only a comparatively short movement of the regulating device or nut 34 is required.

For most classes of service it is preferable to provide means whereby the regulating device 34 serves to automatically stop the motor 25 after the desired amount of movement of the controlling mechanism. When a rotary elastic fluid motor is used, as is preferred and as is shown, the motor control mechanism takes the form of a suitable valve mechanism.

As shown particularly in Figs. 3, 5 and 6, there is provided a valve 36 comprising a cylinder 37 with a double piston 38 slidable therein. This piston is connected by means of a link 39 with a bell-crank 40. The bell-crank 40 is pivotally connected with the regulating device or nut 34 so as to be bodily movable vertically therewith. One arm of the bell-crank is connected with the link 39 as aforesaid and the other arm is connected with a reach rod 41 which extends rearward to a suitable handle or controlling lever 41$^a$ in the cab. It will be understood, particularly by reference to Fig. 1, that this construction makes it possible for the engineer to oscillate the bell-crank 40 and thus raise or lower the piston in the valve 36. It will also be clear that any vertical movement of the regulating device 34 will raise or lower the bell-crank bodily without any material amount of rotary movement thereof. The result is that the piston 38 in the valve 36 is also raised or lowered in accordance with the vertical movement of the regulating devce 34.

Referring particularly to Figs. 3, 5 and 6, it will be noted that pipes 42 and 43 connect the motor 25 with the valve 36. Elastic fluid, (either air or steam) is supplied to the valve 36 through a pipe 44. The valve 36 is of the balanced type, the piston 38 having two heads with a space between them to which the air (or steam) under pressure is supplied. Preferably, the cylinder 37 is provided with a lining 45 having two circumferential rows of ports 46 and 47 therein. The body of the cylinder is provided with annular grooves 48 and 49, with which the ports register and the aforementioned pipes 42 and 43 are connected to communicate respectively with the grooves 48 and 49. When the piston is in its central or neutral positions, as shown in Fig. 5, the piston heads cut off the air supply from both sets of ports and no air is admitted to the motor. When the piston is moved to its upper position, as shown in Fig. 6, air is admitted to the pipe 42 and the pipe 43 is permitted to exhaust into the atmosphere through the opening in the bottom of the cylinder. Similarly, when the piston is in its lower position, air is supplied to the pipe 43 and the pipe 42 is permitted to exhaust into the atmosphere at the top of the cylinder. By thus changing the position of the valve pistons the motor can be rotated in either direction or it can be stopped. Preferably the body of the cylinder 37 is also provided with small annular grooves 50, 50 located between the air supply and the respective grooves 48 and 49. Small vents 51, 51 serve to connect these grooves 50, 50 with the atmosphere. These grooves 50, 50 are provided as a safeguard to prevent air under pressure from reaching the grooves 48 and 49. With a construction such as I have shown, it is possible that the lining or bushing 45 may not tightly fit the cylinder 37, but with the grooves 50, 50 as shown, any leakage into the space between the lining and the cylinder would be led out into the atmosphere and no harm would result.

From the foregoing description it will be clear that the engineer in the cab can, by means of the lever 41$^a$, the link 41, the bellcrank 40 and the link 39, move the valve piston into its upper position or its lower position, or any intermediate position. With the piston in any position except the central one, the motor will immediately start to rotate, thus operating the screws 18, 18 and raising or lowering the radius rods 13, 13. Simultaneously however, the regulating device 34 moves in a direction to return the valve piston to its central or neutral position. As soon as this central or neutral position is reached, the air is cut off from the motor and the motor stops. In this way the radius rods 13 are moved through any desired definite distance, as determined by the position of the lever 41$^a$. The relative positions of the rods therefore correspond directly with the positions of the controlling lever in the cab.

Fig. 7 shows a construction which is quite similar to that shown in Figs. 1 to 3, but having certain differences in mechanical details. In this construction bevel gears 22$^a$ and 23$^a$ are provided for connecting the shaft 22 with the screws 18, 18. The motor 25 is located with its axis horizontal instead of vertical and the drive shaft 28 of the motor is connected with the power shaft 22 by means of spur gears 29$^a$ and 30$^a$. The operation of this mechanism is similar to that already described and repetition will be unnecessary.

With the mechanism already described, an appreciable amount of movement of the valve piston 38 is necessary to uncover the ports 46 or 47. In some cases it may be preferable to use a valve mechanism which will act with less movement. Fig. 8 shows diagrammatically a quick acting valve mechanism which can be substituted for the valve 36 already described. Instead of a single valve I provide four separate valves 52, 53, 54 and 55. These valves may conveniently be of the type known as "whistle" valves, one of these valves being shown in section in Fig. 9. It will be observed that the valve has two chambers 54$^a$ and 54$^b$ communicating respectively with the pipes 44$^b$ and 43$^b$. An opening between these two chambers is normally closed by a valve head 54$^c$ which is of the poppet type having a stem 54$^d$ which projects outward beyond the body of the valve. The valve head 54$^c$ is normally held in closed position by a spring 54$^e$. It will be observed that the passageway through the valve is opened immediately upon the movement being given to the valve stem 54$^d$. This is in contrast with the operation of the valve shown in Figs. 5 and 6 wherein a certain amount of initial movement away from the neutral position must take place before either one of the ports is uncovered. Movably mounted between the valves is a control member 56 adapted to be raised or lowered by means of a link 39$^a$ connected with the bellcrank 40. The construction of the valves is such that they are all closed when the member 56 is in the central position. When this member is moved upward the valves 52 and 53 are opened practically instantaneously, and when the member is moved downward the valves 54 and 55 are opened practically instantaneously. Air is supplied to the valves 52 and 54 by means of branches 44$^a$, 44$^b$ of the pipe 44. The valves 52 and 55 are connected with the pipe 42 by means of branch pipes 42$^a$ and 42$^b$ respectively; and the valves 53 and 54 are connected with the pipe 43 by means of the branch pipes 43$^a$ and 43$^b$ respectively. When the member 56 is moved upward to open the valves 52 and 53, air under pressure is admitted to the pipe 42 through the branch pipes 44$^a$ and 42$^a$. At the same time the pipe 43 is connected with the atmosphere through the branch pipe 43$^a$ and the valve 53. This connects the motor for rotation in one direction. When the member 56 is moved downward to open the valves 54 and 55 air under pressure is admitted to the pipes 43 through the branch pipes 44$^b$ and 43$^b$. At the same time pipe 42 is connected with the atmosphere through the branch pipe 42$^b$ and the valve 55. Thus the motor is connected for rotation in the other direction.

I have shown and described a construction wherein provision is made for the automatic stopping of the motor by the regulating device which moves in timed relation with the adjusting mechanism. While this construction is ordinarily preferable, it is not absolutely essential and in some cases it may be desired to provide a somewhat simpler construction, in which the motor is stopped by the engineer under the guidance of the regulating device.

In Fig. 10 is shown a construction in which the motor instead of being mounted close to the shaft 22 is mounted in or near the engineer's cab. The adjusting mechanism itself is or may be the same as already described and no further description is necessary. For rotating the shaft 22, a shaft 57 is provided which extends upward and rearward to the cab. Bevel gears 58 and 59 connect the two shafts 57 and 22. The motor is shown at 25ª and this is or may be similar to the motor 25 already described. The motor 25ª is connected with the shaft 57 by means of gears 29ᵇ and 30ᵇ. A hand lever 60 is provided for starting and stopping the motor 25ª.

Instead of providing a regulating device in the form of a nut 34 operated by a screw connected with one of the screws 18, I provide a regulating device 34ª in the form of a nut engaging a screw 35ª on the shaft 57. The regulating device 34ª carries a pointer 61 which moves along an indicator plate 62 having graduated lines thereon.

In operation the engineer starts the motor 25 in the desired direction by means of the lever 60 and the extent of relative movement of the linkage is indicated by the position of the pointer 61 on the plate 62. By watching the indicator 61 the engineer can stop the motor as soon as the linkage is moved to the desired adjustment. The regulating device 34ª therefore enables the motor to be stopped after a desired definite change in the operative relationship of the linkage.

Preferably a hand wheel 63 is provided at the end of the shaft 57 so that the engineer may adjust the linkage by hand.

It will be noted that the adjusting mechanism embodying my invention is adapted either to be incorporated in new locomotives or to be applied to locomotives already in operation. The mechanism may be designed and constructed with the locomotive as an entirety to form an original component unit thereof, or the design may be such that the parts can be easily attached to existing locomotives, simple changes in construction adapting it for all types of reverse linkages.

What I claim is:

1. The combination in a power reverse gear for locomotives, of linkages; a shaft extending from one side of the locomotive to the other side; a reversible motor for driving said shaft; control means for the motor; a mechanism at each side of the locomotive driven by the shaft for changing the operative relations of the linkages; and locking the same in the position in which they are adjusted.

2. The combination in a reverse gear for locomotives, of linkages; a shaft extending from one side of a locomotive to the other side; a reversible motor geared to the shaft; means for controlling said motor; two self-locking mechanisms geared to the shaft for changing the operative relations of the respective linkages, each of said mechanisms having a nut; and a link connecting the nut with its linkage.

3. The combination in a reverse gear for locomotives, of radius rods; a shaft extending from one side of the locomotive to the other under the boiler; a reversible motor for driving said shaft; control mechanism for the motor; and two mechanisms, each consisting of a standard mounted on the frame of the locomotive; a screw shaft on said frame geared to the transverse shaft; a nut on the screw shaft; and a link connecting each nut with a radius rod of the locomotive.

4. The combination in a power reverse gear for locomotives, of a radius rod; a frame; a screw mounted in the frame; a non-rotatable nut on the screw, a link connecting the nut to the radius rod, the screw having an extension with a thread thereon of less pitch than the main thread, a nut on said extension; a valve cylinder; a valve therein; and means connecting the valve with the nut.

5. The combination in a power reverse gear for locomotives, of radius rods; a transverse shaft extending from one side of the locomotive to the other side; a reversible motor for driving said shaft; a screw shaft at each side of the locomotive geared to the transverse shaft; a nut on each screw shaft; a link connecting each nut with a radius rod; a screw connected to one of said screw shafts; a nut on the screw; a valve casing connected to the motor; and a valve in said casing connected to the last-mentioned nut.

6. The combination in a power reverse gear for locomotives, of radius rods; a transverse shaft extending under the boiler of the locomotive; a reversible motor for driving said shaft; a worm on each end of said shaft; a screw shaft at each side of the locomotive, each shaft having a worm wheel meshing with a worm; and a nut on each side connected to a radius rod.

WILLIAM A. CRAIG.